(12) United States Patent
Yang

(10) Patent No.: US 9,327,612 B2
(45) Date of Patent: May 3, 2016

(54) EMERGENCY POWER SUPPLY SYSTEM FOR FUEL CELL-POWERED VEHICLE

(71) Applicant: Hyundai Motor Company, Seoul (KR)

(72) Inventor: Sung Ho Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/475,952

(22) Filed: Sep. 3, 2014

(65) Prior Publication Data

US 2015/0314702 A1    Nov. 5, 2015

(30) Foreign Application Priority Data

May 2, 2014   (KR) .................. 10-2014-0053362

(51) Int. Cl.
*B60L 11/18*   (2006.01)

(52) U.S. Cl.
CPC .......... *B60L 11/1887* (2013.01); *B60L 11/1861* (2013.01); *B60L 11/1881* (2013.01)

(58) Field of Classification Search
CPC . B60L 11/00; B60L 11/1851; B60L 11/1861; B60L 11/1864; B60L 11/1866; B60L 11/1868; B60L 11/1881; B60L 11/1887; B60L 11/1898
USPC .......... 701/22, 36; 429/12, 13, 23, 22, 34, 46, 429/401, 428
See application file for complete search history.

(56) References Cited

U.S. PATENT DOCUMENTS

| | | | |
|---|---|---|---|
| 6,484,075 B2 * | 11/2002 | Hasegawa ........... | B60L 11/1881 180/293 |
| 6,573,682 B1 * | 6/2003 | Pearson ............ | H01M 8/04007 320/101 |
| 6,792,341 B2 * | 9/2004 | Hunt ................... | B60L 11/1887 180/65.265 |
| 7,449,259 B2 | 11/2008 | Zhu et al. | |
| 7,999,409 B2 * | 8/2011 | Wang ................ | H01M 8/04888 307/17 |
| 2002/0047309 A1 * | 4/2002 | Droppo ..................... | H02J 7/34 307/43 |
| 2004/0083039 A1 * | 4/2004 | Hunt ................... | B60L 11/1887 701/22 |
| 2005/0184495 A1 * | 8/2005 | Zerbe ................... | B60L 3/0046 280/735 |
| 2008/0140275 A1 * | 6/2008 | Chung ............... | B60L 11/1881 701/22 |
| 2010/0009219 A1 * | 1/2010 | Kwon ................ | B60L 11/1887 429/432 |

FOREIGN PATENT DOCUMENTS

| | | |
|---|---|---|
| JP | 2007-157477 A | 6/2007 |
| JP | 2007165104 A | 6/2007 |
| JP | 2009089536 A | 4/2009 |
| JP | 2010172155 A | 8/2010 |
| KR | 10-2012-0020686 A | 3/2012 |
| KR | 10-2012-0130804 A | 12/2012 |
| KR | 10-2013-0074617 | 7/2013 |

* cited by examiner

*Primary Examiner* — Thomas Tarcza
*Assistant Examiner* — Tyler J Lee
(74) *Attorney, Agent, or Firm* — Mintz Levin Cohn Ferris Glovsky and Popeo, P.C.; Peter F. Corless

(57) ABSTRACT

An emergency power supply system for a fuel cell-powered vehicle is provided. In particular, the system includes a low voltage DC-DC converter (LDC) designed to convert an output voltage from either a fuel cell stack, or a bi-directional high voltage DC-DC converter into a low voltage and supply the low voltage to a low voltage battery, a DC-DC converter designed to convert an output voltage from either the fuel cell stack or the bi-directional high voltage DC-DC converter into a low voltage, and a fuel cell controller designed to determine whether to supply an output voltage from the DC-DC converter to an output voltage supply line of the low voltage battery.

8 Claims, 3 Drawing Sheets

EMERGENCY POWER SUPPLY SYSTEM FOR FUEL CELL-POWERED VEHICLE

CROSS REFERENCE TO RELATED APPLICATION

The present application claims priority of Korean Patent Application Number 10-2014-0053362 filed on May 2, 2014, the entire contents of which application are incorporated herein for all purposes by this reference.

BACKGROUND OF THE INVENTION

1. Field of the Invention

The present invention relates, in general, to an emergency power supply system for a fuel cell-powered vehicle and, more particularly, to an emergency power supply system for a fuel cell-powered vehicle, which, when a low voltage DC-DC converter (LDC) has a continuous operational problem during running of a fuel cell-powered vehicle, keeps a fuel cell activated using a DC-DC converter provided within a high voltage electronic appliance, thereby maintaining continuous running of the fuel cell-powered vehicle.

2. Description of the Related Art

Generally, a low voltage battery in a fuel cell-powered vehicle serves as both a power source of main controllers of a fuel cell system, such as fuel cell unit (FCU), motor control unit (MCU), etc., and a power source of e.g. an air conditioner in a vehicle. Further, the low voltage battery is an essential element to initially start a vehicle.

As such, a fuel cell-powered vehicle is driven in such a manner that, after a fuel cell is operated with an initially-generated high voltage, a low voltage battery is continuously charged with a low voltage converted by a low voltage DC-DC converter (LDC). However, when the LDC has an operational problem during running of a fuel cell-powered vehicle so as not to continuously supply power, the fuel cell-powered vehicle stops running due to discharge of the low voltage battery.

If this occurs when a vehicle is being driven, even with sufficient supply of high voltage energy for driving of a vehicle, a supply of power from the low voltage battery is interrupted, disabling running operations and re-start of the vehicle.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention provides an emergency power supply system for a fuel cell-powered vehicle, which, when a low voltage battery is insufficiently charged due to an operational error of a low voltage DC-DC converter (LDC), supplies power from a DC-DC converter provided within a high voltage electronic appliance in order to keep a fuel cell activated and thus continuously maintain the running of a fuel cell-powered vehicle.

In order to achieve the above object, according to one aspect of the present invention, there is provided an emergency power supply system for a fuel cell-powered vehicle is provided. In particular, a low voltage DC-DC converter (LDC) designed to convert an output voltage from either a fuel cell stack or a bi-directional high voltage DC-DC converter into a low voltage (e.g., 12V) and supply the low voltage to a low voltage battery. A DC-DC converter designed to convert an output voltage from either the fuel cell stack or the bi-directional high voltage DC-DC converter into a low voltage; and a fuel cell controller designed to determine whether to supply an output voltage from the DC-DC converter to an output voltage supply line of the low voltage battery.

The DC-DC converter may be provided within a high voltage electronic appliance. The output voltage supply line of the low voltage battery may be connected between the low voltage battery and the fuel cell controller.

The output voltage supply line of the low voltage battery may be connected to at least one of the fuel cell controller, a battery control system, and a bi-directional high voltage converter to supply a low voltage thereto. The emergency power supply system may further include a relay connected between the DC-DC converter and the output voltage supply line, and the fuel cell controller may control the relay to be turned on so as to supply the output voltage from the DC-DC converter to the output voltage supply line of the low voltage battery.

The fuel cell controller may be configured to, when receiving an error signal from the LDC or when communication with the LDC is interrupted, control the relay to be turned on. The fuel cell controller may be configured to control the relay to be turned on when the state of charge (SOC) of the low voltage battery amounts to a predetermined SOC. The predetermined SOC may have a value higher than that of the SOC when a supply of power from the low voltage battery is interrupted.

According to the emergency power supply system for a fuel cell-powered vehicle, when the low voltage battery cannot be charged with electricity during running of a fuel cell-powered vehicle, emergency power is supplied, keeping a fuel cell activated and maintaining continuous driving of the vehicle.

Further, the emergency power supply system can be easily realized by simply adding the low voltage wiring and a low voltage relay circuit to a conventional fuel cell-powered vehicle.

Furthermore, the emergency power supply system can be adapted to a variety of eco-friendly vehicles such as electric vehicles, hybrid-vehicles and the like, which use a high voltage as a power source.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Hereinbelow, an emergency power supply system for a fuel cell-powered vehicle according to preferred embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid fuel cell vehicles, electric fuel cell vehicles, combustion, plug-in hybrid electric fuel cell vehicles, hydrogen-powered vehicles and other alternative fuel vehicles (e.g. fuels derived from resources other than petroleum).

Figure 1:
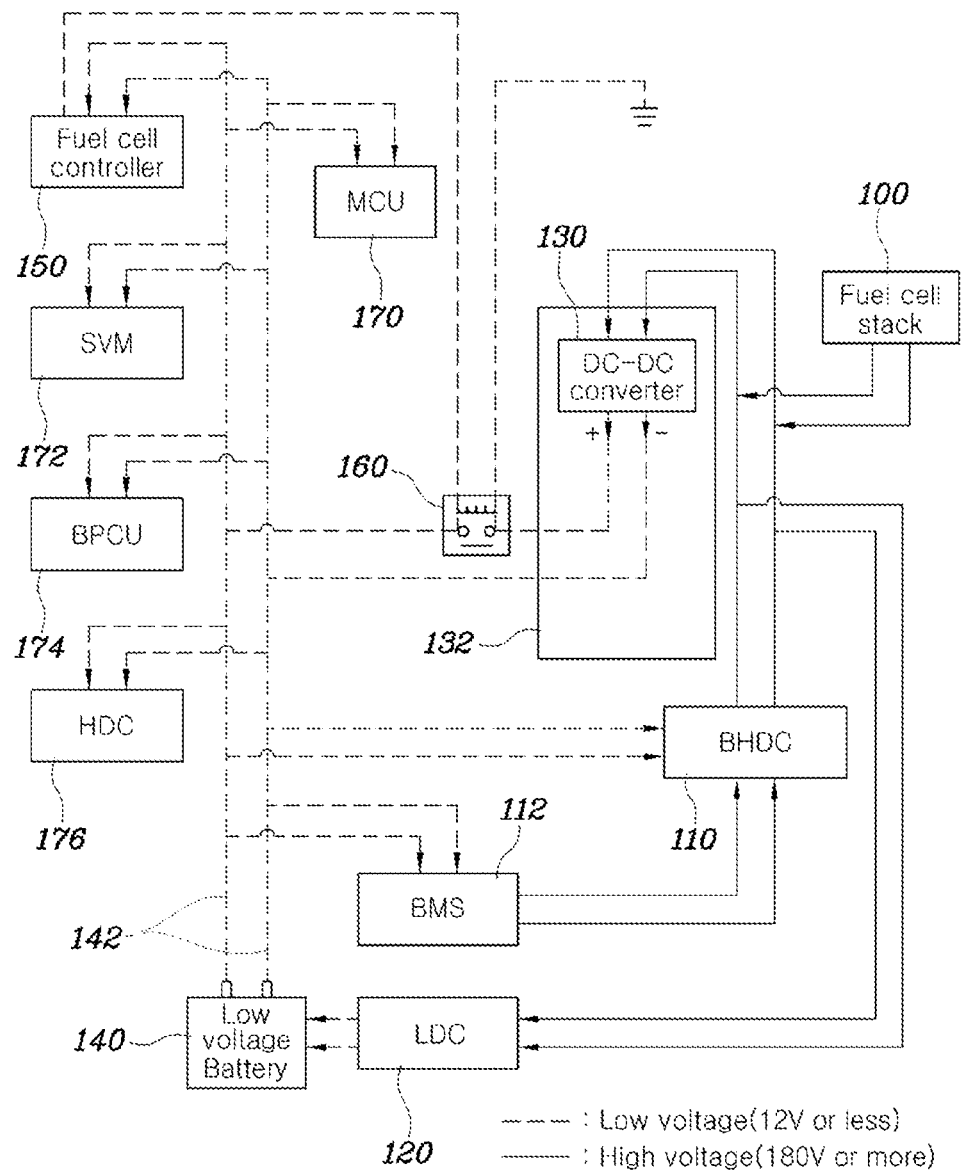
FIG. 1 is a block diagram showing an emergency power supply system for a fuel cell-powered vehicle according to an exemplary embodiment of the present invention.
Figure 2:
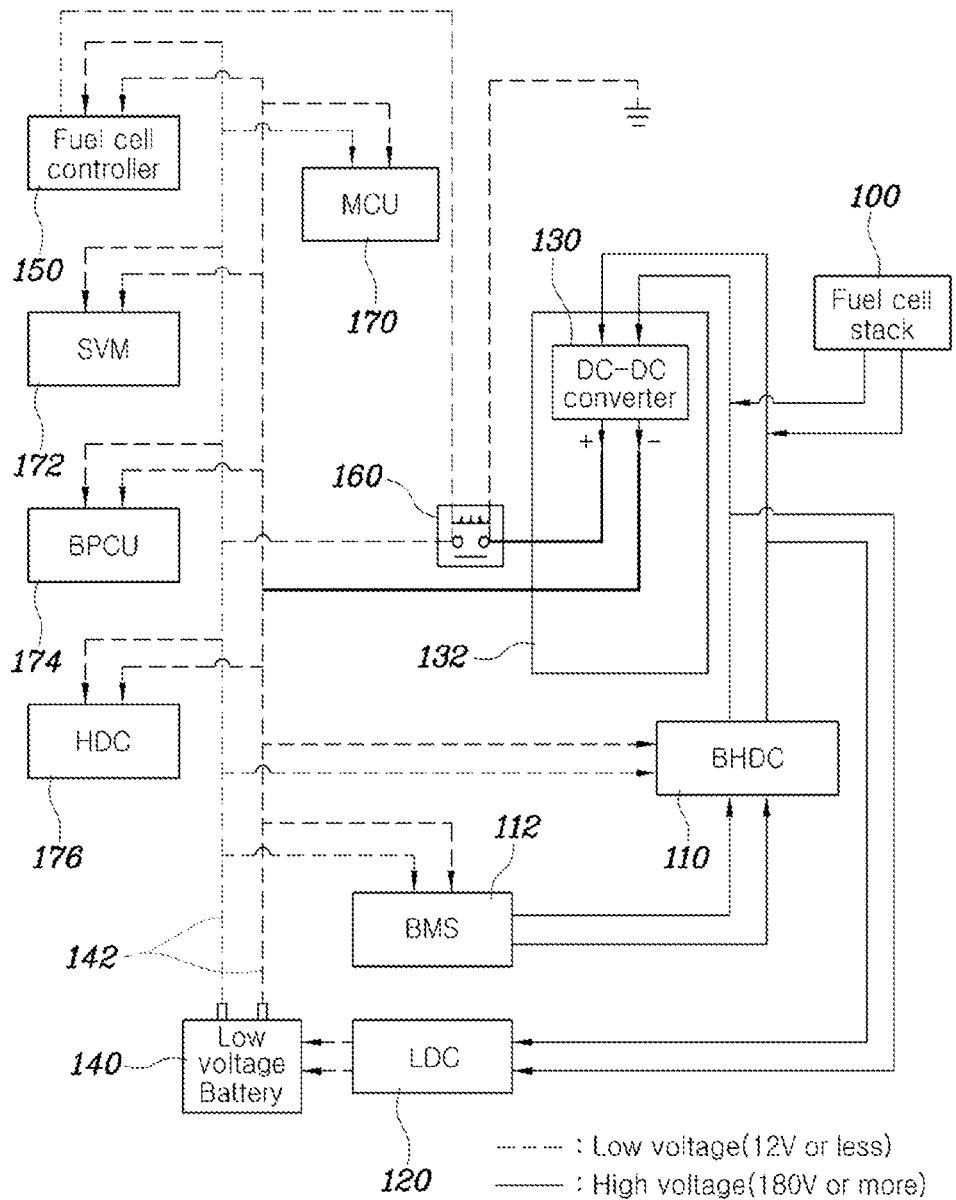
FIG. 2 is a block diagram showing the emergency power supply system when in a normal operation.
Figure 3:
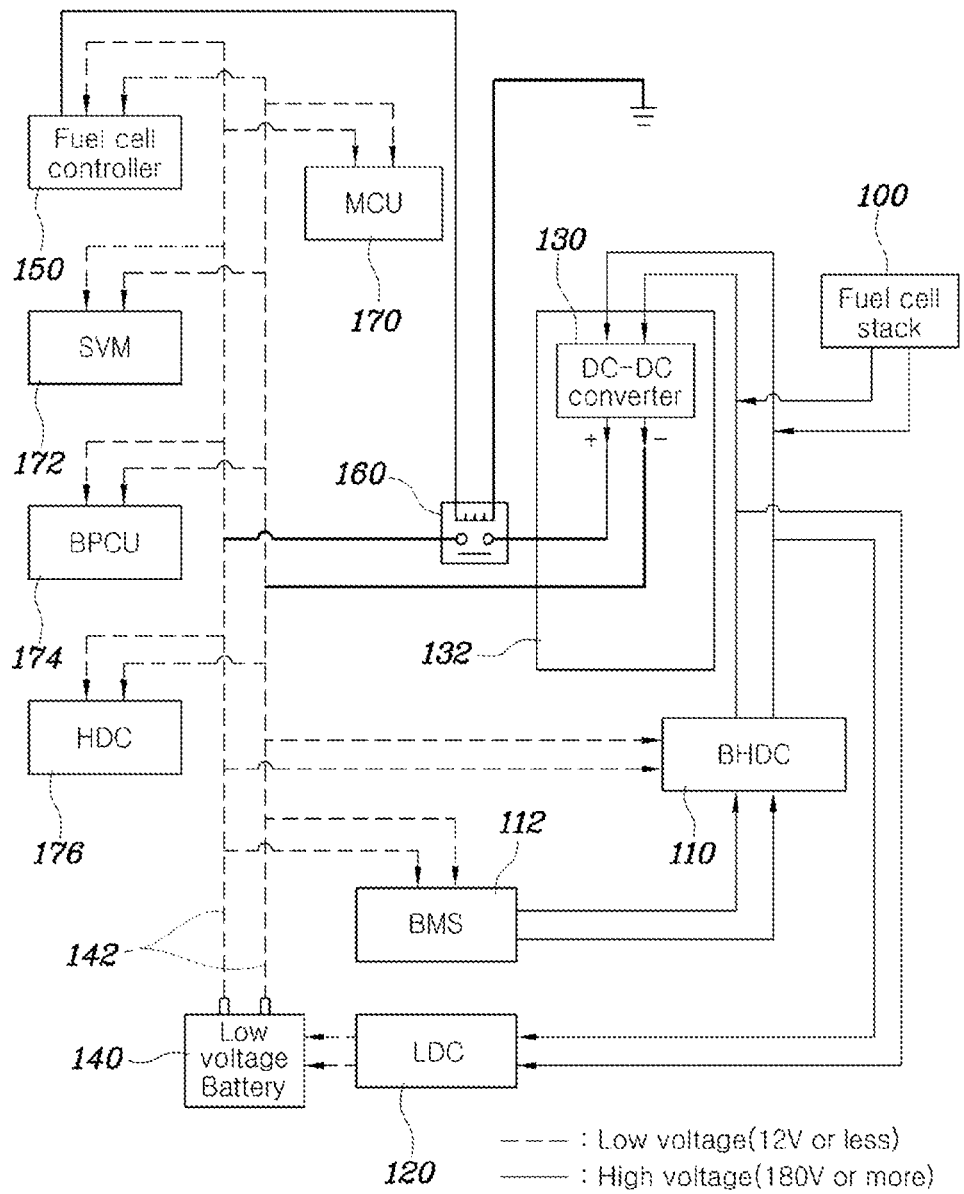
FIG. 3 is a block diagram showing the emergency power supply system when in a supply of emergency power.

FIG. 1 is a block diagram showing an emergency power supply system for a fuel cell-powered vehicle according to an embodiment of the present invention, FIG. 2 is a block diagram showing the emergency power supply system when in a normal operation, and FIG. 3 is a block diagram showing the emergency power supply system when in a supply of emergency power.

Referring to FIGS. 1 to 3, the emergency power supply system may include: a low voltage DC-DC converter (LDC) 120 which is designed to convert an output voltage from either a fuel cell stack 100 or a bi-directional high voltage DC-DC converter (BHDC) 110 into a low voltage (about 12 V) and supply the low voltage to a low voltage battery 140. Also included is a DC-DC converter 130 which is designed to convert an output voltage from either the fuel cell stack 100 or the bi-directional high voltage DC-DC converter 110 into a low voltage, and a fuel cell controller 150 which is designed to determine whether to supply an output voltage from the DC-DC converter 130 to an output voltage supply line 142 of the low voltage battery 140.

The LDC 120 converts a high voltage of about 250V or more, input from the fuel cell stack 100 and the BHDC (Bi-directional High voltage DC-DC Converter) 110, into a low voltage and supplies the low voltage to the low voltage battery 140. The low voltage battery 140 is charged with the low voltage input from the LDC 120. The charged low voltage battery 140 outputs the low voltage to the output voltage supply line 142.

Here, the BHDC 110 receives a high voltage of about 180V from a battery management system (BMS) 112 and converts the input into a high voltage of 250V or more for the driving of a vehicle. The BMS 112 uses a low voltage of 12V or less supplied from the output voltage supply line 142 as a control power source. The DC-DC converter 130 may be provided within a high voltage electronic appliance 132. For example, the high voltage electronic appliance 132 may be e.g. a radiator fan which is individually equipped with a DC-DC converter 130.

One or more high voltage electronic appliances 132, which are provided in a vehicle, are each provided with a DC-DC converter 130 which converts a high voltage into a low voltage by itself without passing through the LDC 120. Such a DC-DC converter 130 separately receives a high voltage Of 250V or more from the fuel cell stack 100 and the BHDC 110 and converts the high voltage into a low voltage of 12V or less. The DC-DC converter then uses the low voltage as a control power source.

The fuel cell controller 150 determines whether to supply the output voltage of the DC-DC converter 130, provided within the high voltage electronic appliance 132, to the output voltage supply line 142 of the low voltage battery. For example, when it is determined that the low voltage is normally supplied from the low voltage battery, the fuel cell controller 150 does not control a relay 160 to be turned on. On the contrary, when it is determined that the low voltage is not being normally supplied from the low voltage battery, the fuel cell controller 150 controls the relay 160 to be turned on so as to supply the output voltage of the DC-DC converter 130 to the output voltage supply line 142. This will be described later. The output voltage supply line 142 of the low voltage battery may be connected between the low voltage battery 140 and the fuel cell controller 150.

Further, the output voltage supply line 142 of the low voltage battery may be connected to at least one of the fuel cell controller 150, the battery management system 112, and the bi-directional high voltage converter 110 to supply a low voltage thereto. Specifically, the output voltage supply line 142 receives a low voltage of 12V or less from the low voltage battery 140. Here, the output voltage supply line is connected to at least one of the fuel cell controller 150, the BHDC 110, the BMS 112, a motor management control unit (MCU) 170, a stack voltage monitor (SVM) 172, a blower/pump management unit (BPCU) 174, and a high voltage DC-DC converter (HDC) 176; so as to supply the input low voltage thereto. If the output voltage supply line 142 is not supplied with the low voltage from the low voltage battery 140, it is supplied with the low voltage from the DC-DC converter 130, provided within the high voltage electronic appliance 132, under the control of the fuel cell controller 150.

The emergency power supply system may further include a relay 160 connected between the DC-DC converter 130 and the output voltage supply line 142. Here, the fuel cell controller 150 may control the relay 160 to be turned on so as to supply the output voltage from the DC-DC converter 130 to the output voltage supply line 142.

The relay 160 may be connected between the DC-DC converter 130 and the output voltage supply line 142. The fuel cell controller 150 may be configured to control the relay 160 to be turned on when an emergency state occurs, thereby connecting the DC-DC converter 130 and the output voltage supply line 142.

Referring to FIG. 2, in a normal state, the relay 160 keeps the DC-DC converter 130 and the output voltage supply line 142 disconnected. As a result, the output voltage of the DC-DC converter 130 is not supplied to the output voltage supply line 142. However, in an emergency situation as shown in FIG. 3, the fuel cell controller 150 detects the emergency state so as to control the relay to be turned on, thereby connecting the DC-DC converter 130 and the output voltage supply line 142.

Specifically, when the fuel cell controller 150 receives an error signal from the LDC 120; when communication with the LDC 120 is interrupted; and/or when the state of charge (SOC) of the low voltage battery 140 reaches a predetermined SOC, the fuel cell controller determines the emergency state. Here, the fuel cell controller may control the relay 160 to be turned on so as to connect the DC-DC converter 130 and the output voltage supply line 142.

That is, when receiving an error signal from the LDC 120, the fuel cell controller 150 determines the emergency state indicating that the low voltage battery 140 has been discharged due to a failure of the LDC 120, so as to control the relay 160 to be turned on. Further, when continuous communication with the LDC 120 is interrupted, the fuel cell controller 150 determines the emergency state indicating that the low voltage battery 140 has been discharged due to a failure of the LDC 120, so as to control the relay 160 to be turned on. Further, when the SOC measured from the low voltage battery 140 reaches a predetermined SOC, the fuel cell controller 150 determines the emergency state indicating that the low voltage battery 140 has been discharged, so as to control the relay 160 to be turned on.

Here, the predetermined SOC may have a value higher than that of the SOC when a supply of power from the low voltage battery is interrupted. This enables continuous running of a fuel cell-powered vehicle without interruption even when an emergency state occur during driving of the vehicle.

According to the emergency power supply system for a fuel cell-powered vehicle, when the fuel cell controller 150 determines the emergency state during driving of a fuel cell-powered vehicle, the fuel cell controller controls the power supply system in such a manner as to supply the output voltage of the DC-DC converter 130 provided within the high voltage electronic appliance 132 to the output voltage supply line 142 of the low voltage battery, thereby preventing interruption of the fuel cell-powered vehicle due to discharge of the low voltage battery 140.

Further, advantageously, the emergency power supply system can be easily realized by adding the low voltage wiring and a low voltage relay 160 to a conventional fuel cell-powered vehicle, and can be adapted to a variety of eco-friendly vehicles such as electric vehicles, hybrid-vehicles and the like, which use a high voltage as a power source.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An emergency power supply system for a fuel cell-powered vehicle, the system comprising:
    a low voltage DC-DC converter (LDC) configured to convert an output voltage from either a fuel cell stack or a bi-directional high voltage DC-DC converter into a low voltage and supply the low voltage to a low voltage battery;
    a DC-DC converter configured to convert an output voltage from either the fuel cell stack or the bi-directional high voltage DC-DC converter into a low voltage;
    a fuel cell controller configured to determine whether to supply an output voltage from the DC-DC converter to an output voltage supply line of the low voltage battery; and
    a relay connected between the DC-DC converter and the output voltage supply line, wherein the fuel cell controller controls the relay to be turned on so as to supply the output voltage from the DC-DC converter to the output voltage supply line of the low voltage battery.

2. The emergency power supply system according to claim 1, wherein the DC-DC converter is provided within a high voltage electronic appliance.

3. The emergency power supply system according to claim 1, wherein the output voltage supply line of the low voltage battery is connected between the low voltage battery and the fuel cell controller.

4. The emergency power supply system according to claim 1, wherein the output voltage supply line of the low voltage battery is connected to at least one of the fuel cell controller, a battery management system, and a bi-directional high voltage converter to supply a low voltage thereto.

5. The emergency power supply system according to claim 1, wherein the fuel cell controller is configured to, when receiving an error signal from the LDC, control the relay to be turned on.

6. The emergency power supply system according to claim 1 wherein the fuel cell controller is configured to, when communication with the LDC is interrupted, control the relay to be turned on.

7. The emergency power supply system according to claim 1, wherein the fuel cell controller is configured to control the relay to be turned on when the state of charge (SOC) of the low voltage battery amounts to a predetermined SOC.

8. The emergency power supply system according to claim 7, wherein the predetermined SOC has a value higher than that of the SOC when a supply of power from the low voltage battery is interrupted.

* * * * *